United States Patent [19]
Hilti et al.

[11] Patent Number: 5,814,688
[45] Date of Patent: Sep. 29, 1998

[54] ANTISTATICALLY TREATED POLYMERS

[75] Inventors: Bruno Hilti, Basel; Markus Bürkle, Birsfelden; Jürgen Pfeiffer, Reinach; Ernst Minder, Sissach; Markus Grob, Allschwil, all of Switzerland

[73] Assignee: Ciba Specialty Chemicals Corporation, Tarrytown, N.Y.

[21] Appl. No.: 795,719

[22] Filed: Feb. 4, 1997

[51] Int. Cl.$^6$ .............. C08L 1/02; C08L 89/00; C08L 89/04; C08L 97/02

[52] U.S. Cl. .............. 524/9; 524/12; 524/13; 524/14; 524/21; 524/35; 524/425; 524/445; 524/448; 524/449; 524/450; 524/451; 524/910; 524/912; 524/913

[58] Field of Search .............. 524/9, 12, 13, 524/14, 15, 16, 21, 34, 35, 425, 426, 427, 442, 443, 444, 445, 446, 447, 448, 449, 450, 451, 492, 493, 494, 910, 912, 913

[56] References Cited

U.S. PATENT DOCUMENTS

| | | | |
|---|---|---|---|
| 5,075,164 | 12/1991 | Bowman et al. | 428/325 |
| 5,244,728 | 9/1993 | Bowman et al. | 428/330 |
| 5,385,968 | 1/1995 | Bowman et al. | 524/444 |
| 5,405,907 | 4/1995 | Bowman et al. | 524/446 |
| 5,424,351 | 6/1995 | Komatsu et al. | 524/444 |
| 5,478,877 | 12/1995 | Komatsu et al. | 524/425 |

FOREIGN PATENT DOCUMENTS

| | | |
|---|---|---|
| 0659818 | 6/1995 | European Pat. Off. . |
| 3150547 | 12/1981 | Germany . |
| 4031818 | 4/1992 | Germany . |
| 4316607 | 11/1994 | Germany . |
| 4324062 | 1/1995 | Germany . |

OTHER PUBLICATIONS

Derwent Abstract J61194274.
Derwent Abstract CA2069861.
Kunststoffe 67 (1977) 3, pp. 154–159.
Velman Enzyclopedia of In. Chem. 5$^{th}$ ed., 1986 vol. A7, 118.

*Primary Examiner*—Peter A. Szekely
*Attorney, Agent, or Firm*—Luther A. R. Hall

[57] ABSTRACT

The invention relates to a composition comprising a thermoplastic, structurally crosslinked elastomeric or thermosetting polymer, which comprises (a) a polar, adsorptive inorganic or organic material in the form of fibers or particles which are in mutual contact, onto which is adsorptively bound (b) a polar antistatic agent comprising a mixture of
  b1) at least one polar organic compound having at least 5 carbon atoms and at least 3 heteroatoms, and
  b2) the salt of an inorganic protic acid, which is solvated or complexed in the polar organic compound. The invention also relates to a second composition comprising b1) a polar inorganic or organic material, b) a polar organic compound having at least 5 carbon atoms and at least 3 heteroatoms and b2) an inorganic salt, to the use of this second composition for the antistatic treatment of polymers, and to a process for preparing antistatically treated polymers.

20 Claims, No Drawings

ANTISTATICALLY TREATED POLYMERS

The invention relates to a composition comprising a thermoplastic, structurally crosslinked elastomeric or thermosetting polymer, which comprises
(a) a polar, adsorptive inorganic or organic material in the form of fibres or particles which are in mutual contact, onto which is adsorptively bound
(b) a polar antistatic agent comprising a mixture of
b1) at least one polar organic compound having at least 5 carbon atoms and at least 3 heteroatoms, and
b2) the salt of an inorganic protic acid, which is solvated or complexed in the polar organic compound. The invention also relates to a second composition comprising b) a polar inorganic or organic material, b1) a polar organic compound having at least 5 carbon atoms and at least 3 heteroatoms and b2) an inorganic salt, to the use of this second composition for the antistatic treatment of polymers, and to a process for preparing antistatically treated polymers.

It is known that polymers are subject to strong electrostatic charging, and that, owing to the low electrical conductivity of polymers, charges once applied can be dissipated only at a slow rate. In addition to the aesthetic factors, however, safety factors often require rapid charge decay. Adverse effects during use which may be mentioned include: soiling of polymer surfaces, electrical shocks to persons coming into contact with polymers, disrupted production as a result of the sticking together of film webs, destruction of electronic components, clumping in polymer powders, and spark discharge as a result of excessive charge buildup with subsequent ignition, which has in the past occasionally led to severe explosions.

It is known that static charging can be restricted by the use of additives which enhance the surface conductivity. These substances, however, have the disadvantage that they are almost totally ineffective at low atmospheric humidity. It is therefore better to use additives which increase the volume conductivity. However, the substances known to increase the volume conductivity, examples being carbon black and metal powders, lower the mechanical properties of the polymers and cannot be used for transparent polymers. A further requirement, expressed with increasing frequency, is that additives should be environmentally unobjectionable.

Further details regarding antistatic additives and the mechanism of static charging can be found, for example, in the "Plastics Additives Handbook", edited by R. Gächter and H. Müller, Hanser Verlag, 3rd edition, 1990, pages 749–775.

In order to achieve permanent antistatic treatment, the proposal has already been made in DE 4 324 062 to coat materials having a large surface area, such as fibres, with a colourless semiconducting material, for example tin oxide. This coated material can then be mixed in with the polymer granules and processed together with them. However, the preparation of this coating is complex, since to prepare the semiconducting coating it is necessary to impregnate fibrous substrates with an aqueous salt solution, then to dry them, and to carry out subsequent thermal conditioning of the deposited salt. These chemical and thermal processes on the fibre may damage the fibre, with the consequence of a lower degree of conductivity than would be expected from the conductivity of the semiconductors. A further disadvantage is that the fibres bend under mechanical loading, and the brittle semiconductor coating can be damaged, thereby likewise impairing the conductivity.

An alternative option is described in DE 43 16 607, where it is proposed to add lubricating, adhesive or coating substances to metallized polymer fibres, as are already available commercially, and thereby to increase their electrical conductivity. However, metallized fibres are relatively expensive, are difficult to produce, and severely reduce the transparency of the polymer into which they are incorporated. Here too, mechanical damage to the conductive coating and even to the fibre (fracture) cannot be ruled out entirely.

Consequently, there continues to be a need for an additive system for increasing the volume conductivity, which has an antistatic action, is ecologically unobjectionable, is effective at low atmospheric humidity, is simple to prepare, which maintains over a long period the volume conductivity which it imparts to the polymer, and which can be employed without notable restriction in all commercially available polymers. It has now been found that polar organic compounds comprising at least 5 carbon atoms and at least 3 heteroatoms in combination with an inorganic salt which is adsorptively bound as adsorbent on the surface or in the pores of inorganic or organic materials can be incorporated into thermoplastic, structurally crosslinked or curable polymers (crosslinkable polymers), imparting to them an outstanding and durable antistatic effect.

Where the polar inorganic or organic material has pores, the organic compounds together with the inorganic salts can be inserted and adsorbed therein, leading to particularly stable antistatic treatments.

A very special advantage is that even relatively low molecular mass combinations of polar or surface-active compounds and inorganic salts, which otherwise tend to exude on the surface of the polymeric material, can be first of all bound by adsorption to the polar inorganic or organic material.

The polar organic compounds, containing a salt, may additionally possess functional groups which form ionic or covalent bonds with functional groups of the carrier material. These functional groups may be polymerizable groups, with the production of particularly durable coatings being possible in this case by polymerization or crosslinking.

An essential precondition for good electrical conductivity is for the particles or fibres of the polar inorganic or organic material to intersect or be in mutual contact at as many sites as possible when incorporated in the polymer. This gives rise to the formation of electrically conducting tracks in which the charges can drain away.

The stability properties of the polymer, such as thermal stability, light stability and resistance to hydrolysis, remain virtually unaffected in the majority of cases.

In the range of low amounts of additive, the optical properties too are largely unaltered, and transparent materials remain essentially transparent.

The invention provides a composition comprising a thermoplastic, structurally crosslinked elastomeric or thermosetting polymer, which comprises
(a) a polar, adsorptive inorganic or organic material in the form of fibres or particles which are in mutual contact, onto which is adsorptively bound
(b) a polar antistatic agent comprising a mixture of
b1) at least one polar organic compound having at least 5 carbon atoms and at least 3 heteroatoms, and
b2) the salt of an inorganic protic acid, which is solvated or complexed in the polar organic compound.

Examples of thermoplastic, structurally crosslinked or heat-curable polymers are listed below.

1. Polymers of monoolefins and diolefins, for example polypropylene, polyisobutylene, polybut-1-ene, poly-4- methylpent-1-ene, polyisoprene or polybutadiene, as well as polymers of cycloolefins, for example of cyclopentene or norbornene; furthermore polyethylene (which optionally can be crosslinked), for example high density polyethylene (HDPE), low density polyethylene (LDPE), linear low density polyethylene (LLDPE), branched low density polyethylene (BLDPE).

Polyolefins, i.e. polymers of monoolefins exemplified in the preceding paragraph, in particular polyethylene and polypropylene, can be prepared by different, and especially by the following, methods:

a) radical polymerization (normally under high pressure and at elevated temperature)

b) catalytic polymerization using a catalyst that normally contains one or more metals of group IVb, Vb, VIb or VII. These metals usually have one or more ligands, such as oxides, halides, alcoholates, esters, ethers, amines, alkyls, alkenyls and/or aryls that may be either $\pi$- or $\sigma$-coordinated. These metal complexes may be in the free form or fixed on substrates, for example on activated magnesium chloride, titanium(III) chloride, alumina or silicon oxide. These catalysts may be soluble or insoluble in the polymerization medium. The catalysts can be active as such in the polymerization or further activators may be used, for example metal alkyls, metal hydrides, metal alkyl halides, metal alkyl oxides or metal alkyloxanes, the metals being elements of groups Ia, IIa and/or IIIa. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide or ethylene-acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned under 1), for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene-carbon monoxide copolymers and mixtures thereof with other polymers, for example polyamides.

4. Hydrocarbon resins (for example $C_5$–$C_9$) including hydrogenated modifications thereof (e.g. tackifier resins) and mixtures of polyalkylenes and starch.

5. Polystyrene poly(p-methylstyrene), poly($\alpha$-methylstyrene).

6. Copolymers of styrene or a-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; mixtures of high impact strength of styrene copolymers and another polymer, for example a polyacrylate, a diene polymer or an ethylene-propylene-diene terpolymer; and block copolymers of styrene such as styrene-butadiene-styrene, styrene-isoprene-styrene, styrene-ethylene/butylene-styrene or styrene-ethylene/propylene-styrene.

7. Graft copolymers of styrene or a-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.

8. Halogen-containing polymers such as polychloroprene, chlorinated rubber, chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from $\alpha,\beta$-unsaturated acids and derivatives thereof such as polyacrylates and polymethacrylates, polymethyl methacrylates, polyacrylamides and polyacrylonitriles, impact-modified with butyl acrylate.

10. Copolymers of the monomers mentioned under 9) with each other or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in point 1.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain comonomers, for example ethylene oxide; polyacetals modified with thermoplastic polyurethanes, acrylates or MBS.

14. Polyphenylene oxides and sulfides, and mixtures thereof with styrene polymers or polyamides.

15. Polyurethanes derived from hydroxyl-terminated polyethers, polyesters and polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12,11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. As well as polyamides or copolyamides modified with EPDM or ABS; and polyamides condensed during processing (RIM polyamide systems).

17. Polyureas, polyimides, polyamide-imides and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1 ,4-dimethylolcyclohexane terephthalate, polyhydroxybenzoates, as well as block polyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenol/formaldehyde resins, urea/formaldehyde resins and melamine/formaldehyde resins.

22. Drying and nondrying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example from epoxy acrylates, urethane acrylates or polyester acrylates.

25. Alkyd resins, polyester resins and acrylate resins crosslinked with melamine resins, urea resins, polyisocyanates or epoxy resins.

26. Crosslinked epoxy resins derived from polyepoxides, for example from bisglycidyl ethers, or cycloaliphatic diepoxides.

27. Natural polymers such as cellulose, natural rubber, gelatin and derivatives thereof which have been chemically modified in a polymer-homologous manner, for example cellulose acetates, cellulose propionates and cellulose butyrates, or the cellulose ethers such as methyl cellulose; as well as rosins and derivatives.

28. Blends (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP or PA/PPO.

Preferred examples of thermoplastic, structurally crosslinked or heat-curable polymers are selected from the group consisting of polyolefins, polystyrenes, polymers of α,β-unsaturated acids, halogen-containing polymers, homo- and copolymers of cyclic ethers, polymers of unsaturated alcohols and amines, polyacetals, polyphenylene oxides, polyurethanes, polyamides, polyesters, polyureas, polycarbonates, polysulfones, crosslinking products of aldehydes on the one hand and phenols, urea or melamine on the other hand, alkyd resins, crosslinkable acrylic resins, crosslinked epoxy resins, cellulose or natural rubber.

Particular preference is given to polyolefins, polystyrenes, polymers of α,β-unsaturated acids, halogen-containing polymers, especially PVC, homo- and copolymers of cyclic ethers, especially with bisphenol A diglycidyl ether.

Very particular preference is given to polyolefins, such as polyethylene in its various modifications, and polypropylene, or a halogen-containing polymer, for example polyvinyl chloride (PVC), especially in suspension polymer or bulk polymer form.

The polar, adsorptive inorganic or organic material can be in the form of fibres or discrete particles. Adsorption can take place on the surface and/or in porous cavities of the fibres or particles.

In the context of the present invention, the attribute porous denotes that the inorganic or organic materials have internal cavities with an internal surface area of at least 1 $m^2/g$ and so are capable of accommodating and storing substances and ions within these pores.

The internal surface area can be determined, for example, in accordance with the BET method. If the organic or inorganic material is porous, the internal surface area is preferably 5–500 $m^2/g$.

Examples of porous, adsorptive inorganic materials which can be used are naturally occurring mineral flours, such as calcite, talc, kaolin, diatomaceous earth, montmorillonite or attapulgite. It is also possible to use phyllosilicates, such as sepiolite or bentonite, highly disperse silicic acids, synthetic, highly absorbent silicic acid, silica gels, molecular sieve zeolites, pumice, crushed brick or porous glass.

The porous, adsorptive inorganic materials may give an acidic, neutral or basic reaction in aqueous solution.

Molecular sieve zeolites are understood to be crystalline, hydrated aluminium silicates, synthetic or naturally occurring, with a framework structure which includes replaceable alkali metal or alkaline earth metal cations (definition in accordance with D. W. Breck, Zeolite Molecular Sieves, J. Wiley, New York, 1974).

Examples of suitable molecular sieve zeolites are zeolite A, zeolite ZSM-5, mordenite, zeolite L, zeolite X, zeolite Y, in their Na, K or Ca form.

Also suitable are phyllosilicates in which the Si atoms are surrounded tetrahedrally by oxygen atoms. Two of these tetrahedral Si layers are connected by a layer of octahedrally coordinated metal, for example Al or Mg, by way of the oxygen atoms. This gives rise to a layered arrangement of tetrahedrons, octahedrons and tetrahedrons which are separated by a two-dimensional interspace until the next structural repeating unit. This interspace may contain counterions for charge compensation. Possible counterions are metal ions, oligo- and polyoxy metal ions, or organic cations.

Particularly suitable phyllosilicates are those having a fibrous composition. The hormit group in particular has the property of forming chainlike fibrous structures with channel-like cavities, and is particularly suitable.

Especial preference is given to the use, as fibrous phyllosilicates, of attapulgite or sepiolite.

Mixtures of different fibrous phyllosilicates with one another, or mixtures with molecular sieve zeolites, are likewise highly suitable.

A review of the hormite group and its occurrence can be found in Ullmann's Encyclopedia of Ind. Chem., 5th Edition 1986, VCH Verlag Weinheim, Vol. A7, page 118.

Natural and synthetic porous, adsorptive inorganic materials are widely available commercially.

Porous, adsorptive organic materials which can be used are, for example, synthetic porous polymers, for example urea-formaldehyde polycondensates (Pergopak), but also naturally occurring sorbent, porous natural substances.

As adsorptive organic fibres it is possible to employ a large number of granular or fibrous, naturally occurring organic materials, such as comminuted wood or plant residues, or processed natural fibres.

Examples of preferred naturally occurring fibres are cellulose fibres, such as cotton, bast, kapok, jute, ramie, flax and hemp. However, it is also possible to employ wool or silk fibres.

The naturally occurring cellulose can have undergone further derivatization, for example as viscose, as cellulose esters or cellulose ethers. The ethers or esters can have different average degrees of substitution, which are usually between 1 and 3.

The organic fibre materials can be used in the form of long spun fibres or in the form of cut staple fibres.

It is also possible to employ the fibres in the form of a two-dimensional network, as a woven piece, as a nonwoven or as a felt.

It is also possible to use synthetic polymer fibres, provided that they have a sufficiently high surface polarity and are able to bind the polar antistatic agent adsorptively. Examples of suitable fibres are polyamide, polyester and polyacrylonitrile fibres. The surface of fibres which are nonpolar per se, for example polyolefin fibres, can also be modified in such a way, by subsequent chemical and/or physical treatment, that these fibres too can be employed in accordance with the invention. A typical example of such modification is the subsequent plasma or corona treatment of, for example, polypropylene fibres.

If polar polymer fibres, for example polyamide fibres, are used, then the polar organic compound which is adsorbed thereon preferably has a functional group which can be polymerized or crosslinked. As a result of this polymerization or crosslinking, particularly durable antistatic properties are obtained.

In order to obtain the desired advantageous effect, the fibres or particles in the polymer matrix must be in contact with one another, since it is by this means that the volume conductivity can occur by way of ions or electron conduction.

The inorganic or organic particles can be present in the form of needles, platelets, cylinders, offset platelets (whiskers), regular or irregular spheres, or may have any other irregular form.

They generally have a mean particle size of from 1 to 5,000, preferably from 10 to 1000 and, with very particular preference, from 50 to 500 micrometers.

Preference is given to particles which are nonspherical and which extend predominantly in one direction. Examples are needles, cylinders and platelets.

Polar inorganic or polar organic fibres are advantageously used, since by this means it is possible to achieve a lower degree of filling, with good conductivity, than with spherical particles.

The inorganic or organic fibres generally have a length of from 0.01 to 200 mm, preferably from 0.1 to 20 mm.

The antistatic agent consists in one part of a polar organic compound having at least 5 carbon atoms and at least 3 heteroatoms. Examples of heteroatoms are oxygen, nitrogen, sulfur and phosphorus, in their various oxidation states.

Antistatic agents to be used in accordance with the invention are known in large numbers and are described, for example, in Kunststoffe 67 (1977) 3, pages 154–159.

Examples of polar organic compounds having at least 5 carbon atoms and at least 3 heteroatoms, which are able to complex or solvate the salt of an inorganic protic acid, are: polyethers, crown ethers, polyols, polyimines, polyamines, polymers derived from pyridine, macrocyclic aza compounds, polysulfides and polyphosphines.

The polar organic compound preferably has 3 to 20 heteroatoms and 5 to 100 carbon atoms.

Preferred heteroatoms are oxygen and nitrogen.

The molecular weight of the polar organic compounds is preferably from 200 to 5000, particularly preferably from 300 to 3000 daltons.

The polar organic compounds are preferably liquid at a temperature of up to 60 C. or soluble in organic solvents.

Examples of polymerizable functional groups are olefinically unsaturated carbon bonds, which are derived for example from $\alpha,\beta$-unsaturated carboxylic acids or their derivatives, glycidyl groups, for example glycidyl ethers, or isocyanate groups.

Examples of inorganic salts which can be employed in accordance with the invention are zinc, alkali metal, alkaline earth metal or ammonium salts of inorganic mineral acids, oxo acids or lower alkylsulfonic acids.

The inorganic salt is preferably selected from the group consisting of $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Ca(CF_3SO_3)_2$, $Mg(ClO_4)_2$, $Mg(CF_3SO_3)_2$, $Zn(ClO_4)_2$, $Zn(PF_6)_2$ and $Ca(CF_3SO_3)_2$.

Preference is given to a composition comprising a thermoplastic, structurally crosslinked elastomeric or thermosetting polymer, which comprises (a) a polar, adsorptive inorganic or organic material in the form of fibres or particles in mutual contact, to which is bound adsorptively (b) a polar antistatic agent comprising a mixture of
(b1) a polyoxyalkylene of the formula (I)
$R_1$—O—[CH($R_3$)—$CH_2$—O—]$_n$—[$CH_2$—[CH(OH)]$_p$—$CH_2$—O]$_q$—[C(O)]$_r$—$R_2$(I), in which
$R_1$ is H, $C_1$–$C_{24}$alkyl, $C_2$–$C_{24}$alkenyl, $C_1$–$C_{24}$alkyl—C(O)—, $C_2$–$C_{24}$alkenyl—C(O)—, $CH_2$=CH—C(O)— or $CH_2$=C($CH_3$)—C(O)—,
$R_2$ is $C_1$–$C_{24}$alkyl, $C_2$–$C_{24}$alkenyl, $CH_2$—COOH or N($C_1$–$C_8$alkyl)$_3$Hal or, if r is 0, is additionally $CH_2$=CH—C(O)— or $CH_2$=C($CH_3$)—C(O)—,
$R_3$ is H or $CH_3$,
Hal is Cl, Br or 1,
n is a number greater than or equal to 2,
p is a number from 1 to 6, and
q and r independently of one another are 0 or 1;
and in which
(b2) an inorganic salt of the formula $\{M^{z+}{}_a A^{(az/b)-}{}_b\}$ is complexed or solvated, where M is a z-valent alkali metal, alkaline earth metal or zinc cation, a and b independently of one another are a number between 1 and 6, and A is an anion of an inorganic protic acid or of an organic oxygen acid of sulfur.

The polyoxyalkylenes which can be used in accordance with the invention as component (b1) of the formula (I)
$R_1$—O—[CH($R_3$)—$CH_2$—O—]$_n$—[$CH_2$—[CH(OH)]$_p$—$CH_2$—O]$_q$—[C(O)]$_r$—$R_2$ (I), in which
$R_1$ is H, $C_1$–$C_{24}$alkyl, $C_2$–$C_{24}$alkenyl, $C_1$–$C_{24}$alkyl—C(O)—, $C_2$–$C_{24}$alkenyl—C(O)—, $CH_2$=CH—C(O)— or $CH_2$=C($CH_3$)—C(O)—,
$R_2$ is $C_1$–$C_{24}$alkyl, $C_2$–$C_{24}$alkenyl, $CH_2$—COOH or N($C_1$–$C_8$alkyl)$_3$Hal or, if r is 0, is additionally $CH_2$=CH—C(O)— or $CH_2$=C($CH_3$)—C(O)—, $R_3$ is H or $CH_3$, Hal is Cl, Br or 1, n is a number greater than or equal to 2, p is a number from 1 to 6, and q and r independently of one another are 0 or 1, are generally known and are either available commercially or can be prepared by known, simple chemical reactions.

Where substituents in the compounds of the formula (I) are alkyl of 1 to 24 carbon atoms, then suitable such radicals are methyl, ethyl, propyl, butyl, pentyl, hexyl, heptyl, octyl, nonyl, decyl, undecyl, dodecyl, tridecyl, tetradecyl, hexadecyl, octadecyl, eicosyl, docosyl and tetracosyl, and also corresponding branched positional isomers.

Where substituents in the compounds of the formula (I) are alkenyl of 1 to 24 carbon atoms, then these radicals are derived from the above alkyl radicals and contain one or more double bonds. Where there is only one double bond, it is preferably located centrally in the hydrocarbon chain. Where two or more double bonds are present in the hydrocarbon chain, then the radical involved is preferably derived from an unsaturated fatty acid. A particularly preferred alkenyl radical is oleyl.

In the compounds of the formula (I) $R_1$ is preferably H, $C_1$–$C_4$alkyl, $CH_2$=CH—C(O)— or $CH_2$=C($CH_3$)—C(O)—.

In the compounds of the formula (I) $R_1$ is preferably $C_6$–$C_{20}$alkyl, $C_6$–$C_{20}$alkenyl or $N(C_1$–$C_8$alkyl$)_3$Cl, $CH_2$=CH—C(O)— or $CH_2$=C($CH_3$)—C(O)—.

In the compounds of the formula (I), n is preferably a number between 2 and 20 and p is preferably a number between 2 and 6.

Particularly preferred individual compounds of the formula I are polypropylene glycol lauryl ester, polypropylene glycol oleyl ether, polypropylene glycol methyldiethylammonium chloride, polyethylene glycol monomethyl ether, polyethylene glycol dimethyl ether, polyethylene glycol lauryl ester, polyethylene glycol oleyl ester, polyethylene glycol oleyl ether, polyethylene glycol sorbitan monolauryl ester, polyethylene glycol stearyl ester, polyethylene glycol polypropylene glycol lauryl ether, polyethylene glycol lauryl ether-carboxylic acid, polyethylene glycol diacrylate, monoacrylate and triacrylate, or polyethylene glycol dimethacrylate, monomethacrylate and trimethacrylate.

If an olefinically unsaturated compound is employed, it can be polymerized or crosslinked on the fibre. This produces a coating on the fibre in which the inorganic salt is complexed or solvated.

A particularly favourable configuration is obtained if polyethylene glycol diacrylate or polyethylene glycol dimethacrylate is used and is polymerized or crosslinked on the polar organic or inorganic material. In this way, particularly stable antistatic treatments are obtained in which exudation of inorganic salt or organic component is very substantially ruled out. Crosslinking can take place on the surface of the fibres or particles, or else in internal cavities (pores).

Examples of suitable further crosslinking components which can be used in addition are trimethylolpropane triacrylate, trimethylolpropane trimethacrylate or other trifunctional compounds. These compounds are commercially available.

The crosslinking or polymerization reaction is known and can be carried out either thermally or photochemically. Examples of catalysts are peroxide compounds, such as $H_2O_2$ or photoinitiators, such as benzyl dimethyl ketal. These catalysts are known and likewise commercially available.

The polar inorganic or organic material is preferably employed in an amount of from 0.01 to 70 parts by weight, particularly preferably from 0.1 to 30 parts by weight, per 100 parts by weight of polymer.

The polar organic compounds having at least 5 carbon atoms and at least 3 heteroatoms are preferably employed in an amount of from 0.01 to 20 parts by weight per 100 parts of polymer.

The inorganic salt used is preferably employed in an amount from 0.01 to 5 parts by weight per 100 parts of polymer.

The ratio of the organic compound having at least 5 carbon atoms and at least 3 heteroatoms to the inorganic salt is preferably from 200:1 to 1:1.

In general, the inorganic salt is first of all mixed with the polar organic compound comprising at least 5 carbon atoms and at least 3 heteroatoms, and then the polar inorganic or organic material is impregnated with this mixture.

The novel thermoplastic, structurally crosslinked or thermosetting polymer may include further additives. These further additives belong in particular to the group of thermal and/or light stabilizers. Thermal stabilization in this context relates both to processing and to use (long-term stability). These further additives are known to the skilled worker and are predominantly available commercially.

Where the polymers concerned are antistatic halogen-containing polymers, as described above, they expediently and additionally include at least one inorganic zinc, barium, cadmium, aluminium, calcium, magnesium or rare earth compound, for example zinc oxide, hydroxide, chloride or sulfide or superbasic zinc oxide/hydroxide addition compounds, or an organic zinc, barium, cadmium, aluminium, calcium, magnesium or rare earth compound from the series of the aliphatic saturated $C_2$–$C_{22}$carboxylates, aliphatic and saturated $C_3$–$C_{22}$carboxylates, or aliphatic $C_2$–$C_{22}$carboxylates substituted with at least one OH group, or whose chain is interrupted by at least one O atom (oxa acids), the cyclic and bicyclic carboxylates of 5–22 carbon atoms, the phenylcarboxylates which are unsubstituted, substituted by at least one OH group and/or substituted by $C_1$–$C_{16}$alkyl, the naphthylcarboxylates which are unsubstituted, substituted by at least one OH group and/or substituted by $C_1$–$C_{16}$alkyl, the phenyl-$C_1$–$C_{16}$alkylcarboxylates, the naphthyl-$C_1$–$C_{16}$alkyl-carboxylates, or the unsubstituted or $C_1$–$C_{12}$alkyl-substituted phenolates.

The abovementioned metal compounds can be present as mixtures of different compounds. In this case preference is given to so-called synergistic metal soap mixtures, for example of the metals Ca and Zn or Ba and Zn. It is also possible for organic zinc, barium, cadmium, aluminium, calcium, magnesium or rare earth compounds to be coated onto a hydrotalcite, zeolite or dawsonite; in this regard see also DE-A-4031818.

Examples of suitable antioxidants are:

1. Alkylated monophenols, for example 2,6-di-tert-butyl-4-methylphenol, 2-butyl-4,6-dimethylphenol, 2,6di-tert-butyl4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6(1'-methylundec-1'-yl)-phenol, 2,4-dimethyl-6-(1'-methylheptadec-1'-yl)-phenol, 2,4-dimethyl-6(1'-methyltridec-1'-yl)phenol, octylphenol, nonylphenol and mixtures thereof.

2. Alkylthiomethylphenols, for example 2,4-dioctylthiomethyl-6-tert-butylphenol, 2,4- dioctylthiomethyl-6-methylphenol, 2,4-dioctylthiomethyl-6-ethylphenol, 2,6-didodecyl-thiomethyl-4-nonylphenol.

3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

4. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

5. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

6. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate.

7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, di-dodecyl mercaptoethyl-2,2-bis(3,5-di-tert-butyl-4-hydroxybenzyl)malonate, di-[4-(1,1,3,3-tetramethylbutyl)phenyl]2,2-bis(3,5-di-tert-butyl-4-hydroxybenzyl)malonate.

8. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl4-hydroxybenzyl)phenol.

9. Triazine compounds, for example 2,4-bisoctylmercapto-6-(3,5di-tert-butyl-4-hydroxyanilino)-1,3,5-triazine, 2-octylmercapto-4,6bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

10. Phosphonates, phosphites and phosphonites, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of the monoethyl ester of 3,5-di-tert-butyl-4-hydroxybenzylphosphonic acid, triphenyl phosphite, diphenyl alkyl phosphites, phenyl dialkyl phosphites, tris (nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,6-di-tert-butyl-4-methylphenyl) pentaerythritol diphosphite, bisisodecyloxypentaerythritol diphosphite, bis(2,4-di-tert-butyl-6methylphenyl) pentaerythritol diphosphite, bis-(2,4,6-tri-tert-butylphenyl) pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-1 2H-dibenzo[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite, $(C_9H_{19}-C_6H_4)_{1.5}-P-(O-C_{12-13}H_{25-27})_{1.5}$.

11. Acylaminophenols, for example 4-hydroxylauranilide, 4-hydroxystearanilide, octyl N-(3,5-di-tert-butyl-4-hydroxyphenyl)carbamate.

12. Esters of β-(3,5-di-tert-butyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)-oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

13. Esters of β-(5-tert-butyl-4-hydroxy-3-methylphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

14. Esters of β-(3.5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)-oxalamide, 3-thiaundecanol, 3-thiapentadecanol, trimethylhexanediol, trimethylolpropane, 4-hydroxymethyl-1 -phospha-2,6,7-trioxabicyclo[2.2.2]octane.

15. Esters of 3,5-di-tert-butyl4-hydroxyphenyl acetic acid with mono- or polyhydric alcohols, e.g. with methanol, ethanol, octanol, octadecanol, 1,6-hexanediol, 1,9- nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis (3,5-di-tert-butyl-4-hydroxy-phenylpropionyl) trimethylenediamine, N,N'-bis(3,5-di-tert-butyl-4-hydroxyphenyl-propionyl)hydrazine.

17. Esters of thiodiacetic acid and thiodipropionic acid

Preference is given to antioxidants from groups 5, 10 and 14, especially 2,2-bis(4-hydroxy-phenyl)propane, esters of 3,5-di-tert-butyl-4-hydroxyphenylpropionic acid with octadecanol or pentaerythritol, or tris(2,4-di-tert-butylphenyl) phosphite.

If desired, it is also possible to employ a mixture of antioxidants differing in structure.

The antioxidants can be used in an amount of, for example, from 0.01 to 10 parts by weight, expediently from 0.1 to 10 parts by weight and, in particular, from 0.1 to 5 parts by weight per 100 parts by weight of polymer.

Examples of suitable UV absorbers and light stabilizers are:

1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5chlorobenzotriazole, 2-(3'-sec-butyl-5'-tert-butyl-2'-hydroxyphenyl) benzotriazole, 2-(2'-hydroxy-4'octoxyphenyl)benzotriazole, 2-(3',5'-di-tert-amyl-2'-hydroxyphenyl)benzotriazole, 2-(3', 5'-bis(α,α-dimethylbenzyl)-2'-hydroxyphenyl)-benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]benzotriazole with polyethylene glycol 300; [R—CH$_2$CH$_2$—COO(CH$_2$)$_3$]$_2$ where R=3'-tert-butyl-4'-hydroxy-5'-2H-benzotriazol-2-ylphenyl.

2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

3. Esters of substituted or unsubstituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl α-cyano-β,β-diphenylacrylate or isooctyl α-cyano-β,β-diphenylacrylate, methyl α-carbomethoxycinnamate, methyl α-cyano-β-methyl-p-methoxy-cinnamate or butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

6. Sterically hindered amines, for example bis(2,2,6,6-tetramethylpiperidyl) sebacate, bis(2,2,6,6-tetramethylpiperidyl) succinate, bis(1,2,2,6,6-pentamethylpiperidyl) sebacate, bis(1,2,2,6,6-pentamethylpiperidyl) n-butyl 3,5-di-tert-butyl-4-hydroxybenzylmalonate, the condensate of 1-hydroxyethyl-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-di(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4,5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione and Chimassorb 966.

7. Oxalylamides, for example 4,4'-dioctyloxyoxanilide, 2,2'-dioctyloxy-5,5'-di-tert-butoxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy and of o- and p-ethoxy-disubstituted oxanilides.

8. 2-(2-Hydroxyphenyl)-1,3,5-triazines, for example 2,4, 6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-[2-hydroxy-4-(2- hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)-phenyl]-4,6-bis(2,4-dimethylphenyl)-1,3,5-triazine.

Examples of suitable peroxide scavengers are:

esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythritol tetrakis(β-dodecylmercapto)propionate or ethylene glycol bismercaptoacetate.

The invention likewise provides a process for preparing an antistatically treated thermoplastic, structurally crosslinked elastomeric or thermosetting polymer, which comprises using apparatus such as calenders, mixers, compounders, extruders and the like to mix a composition comprising (a) a polar, adsorptive inorganic or organic material in the form of particles or fibres, to which is adsorptively bound (b) a polar antistatic agent comprising a mixture of b1) at least one polar organic compound having at least 5 carbon atoms and at least 3 heteroatoms, and b2) the salt of an inorganic protic acid which is complexed or solvated in the polar organic compound, as such or in the form of their individual constituents, and with or without further additives, with a thermoplastic, structurally crosslinked elastomeric or thermosetting polymer.

Preparation can take place in a manner known per se, by mixing the abovementioned additives and, if desired, further additives with the polymer using apparatus which is known per se, such as calenders, mixers, compounders, extruders and the like. In this procedure, the additives can be added individually or in a mixture with one another. It is also possible to employ so-called masterbatches.

An antistatically treated thermoplastic polymer obtainable in accordance with the present invention can be brought into the desired form by known techniques. Examples of such techniques are milling, calendering, extrusion, injection moulding, sintering, compression sintering or spinning, and also extrusion blow moulding, or processing by the plastisol method. The antistatically treated thermoplastic polymer can also be processed into foam materials.

The invention further provides a composition comprising
(a) a polar, adsorptive inorganic or organic material in the form of particles or fibres, to which is adsorptively bound
(b) a polar antistatic agent comprising a mixture of
b1) at least one polar organic compound having at least 5 carbon atoms and at least 3 heteroatoms, and
b2) the salt of an inorganic protic acid which is complexed or solvated in the polar organic compound.

Preference is given to a composition comprising
(a) a polar, adsorptive inorganic or organic material in the form of fibres or particles, to which is bound adsorptively
(b) a polar antistatic agent comprising a mixture of
(b1) a polyoxyalkylene of the formula (I)

$R_1$—O—[CH($R_3$)—$CH_2$—[CH(OH)]$_p$—$CH_2$—O]$_q$—[C(O)]$_r$—$R_2$ (I), in which $R_1$ is H, $C_1$-$C_{24}$alkyl, $C_2$-$C_{24}$alkenyl, $C_1$-$C_{24}$alkyl—C(O)—, $C_2$-$C_{24}$alkenyl—C(O)—, $CH_2$=CH—C(O)— or $CH_2$=C($CH_3$)—C(O)—, $R_2$ is $C_1$-$C_{24}$alkyl, $C_2$-$C_{24}$alkenyl, $CH_2$—COOH or N($C_1$-$C_8$alkyl)$_3$Hal or, if r is 0, is additionally $CH_2$=CH—C(O)— or $CH_2$=$CCH_3$—C(O)—, $R_3$ is H or $CH_3$,
Hal is Cl, Br or 1, n is a number greater than or equal to 2, p is a number from 1 to 6, and q and r independently of one another are 0 or 1; and (b2) an inorganic salt of the formula $\{M^{z+}{}_a A^{(az/b)-}{}_b\}$ is complexed or solvated therein, where M is a z-valent alkali metal, alkaline earth metal or zinc cation, a and b independently of one another are a number between 1 and 6, and A is an anion of an inorganic protic acid or of an organic oxygen acid of sulfur.

The individual constituents of the mixture are subject to the preferences set out above; similarly, this composition may include the further constituents described previously.

The invention also provides for the use of a novel composition for improving the antistatic properties of thermoplastic, structurally crosslinked elastomeric or thermosetting polymers. The novel polymer composition is particularly suitable for wire sheathing and cable insulation applications. However, it is also possible to produce decorative films, foams, agricultural films, hoses, sealing profiles and office films.

The novel polymer compositions can also be used as moulding compositions for the production of hollow articles (bottles), packaging films (thermoformed films), blowing films, crashpad films (cars), tubes, foams, heavy profiles (window frames), translucent-wall profiles, construction profiles, sidings, fittings, office films and apparatus casings (computers, domestic appliances).

Consequently, the invention also provides for the use of a novel composition for wire sheathing or cable insulation applications.

The examples which follow illustrate the invention.

EXAMPLE 1

Cellulose panels (hardwood, bleached) are cut into strips (about 6×1cm$^2$), of which 7.28 g are placed in a solution of polyethylene glycol laurate (Irgastat 51, Ciba) containing 10% Li methylsulfonate. The strips lie in a porcelain dish which is in an evacuable vessel. Degassing is carried out for about 30 minutes under a pressure of 0.5 mbar. The impregnated strips are then stood up to drip dry. The weight of the impregnated cellulose is now 11.39 g. The strips which have been impregnated in this way are cut into pieces measuring about 1×1 cm$^2$ and are comminuted to fibres in an ultracentrifugal mill (Retsch, model ZM 1000) with an annular sieve of 0.5 mm.

EXAMPLE 2

4.0 g of the impregnated cellulose described in Example 1 are added to 50 g of the polypropylene Moplen FLF 20, and the components are carefully mixed. This mixture is processed in a 2-roll mill (calender) at 180° C. for 5 minutes to form a rolled sheet (nip 0.5 mm). Subsequently, plates are prepared using a metal template (15×15×0.05 cm$^3$) under pressure in a heated hydraulic press (processing for 5 minutes at 190° C.). The plates which are used in this way show a volume resistance $R_v$ of 4×10$^{11}$ ohms (measured with a voltage of 500 V and a ring electrode of 20 cm$^2$, gap 0.5 cm (DIN 53482) at 22° C.). After storage at 22° C. in about 70% relative humidity for one week, the $R_v$ fell to 6×10$^7$ ohms (ring electrode) and the surface resistance $R_s$ is 4.2×10$^8$ ohms (sprung-tongue electrode in accordance with DIN 53482).

EXAMPLE 3

Ramie fibres (6 mm in length, type 290 from Fischer, CH-Dottikon) are milled in an ultracentrifugal mill (Retsch, model ZM 1000) with a 0.12 mm annular sieve. 3 g of these fibres are placed in a glass beaker, covered with a solution of the polyethylene glycol 400 diacrylate Sartomer SR 344 and 4% $NaClO_4H_2O$, stirred up and degassed in a vacuum vessel at 0.5 mbar for about 30 minutes. This solution is then filtered off and the residue (impregnated fibres) is freed from excess solution between filter paper in a hydraulic press: residue=4.9 g.

EXAMPLE 4

2 g of the impregnated fibres described in Example 3 are finely divided, added to 60 g of the polypropylene Moplen FLF 20, and mixed. The mixture is processed in a 2-roll mill (calender) at 180° C. for 7 minutes to form a rolled sheet (nip 0.5 mm). Subsequently, plates are produced with a metal template (15×5×0.05 $cm^3$) under pressure in a heated hydraulic press (processing for 5 minutes at 190° C.). Immediately after their production, the plates produced in this way showed a volume resistance $R_v$ of $9.9 \times 10^{10}$ ohms and a surface resistance $R_s$ of $1.3 \times 10^{11}$ ohms (measured with a voltage of 500 V and a ring electrode of 20 $cm^2$, gap 0.5 cm (DIN 53482) at 22° C.). After storage for 2 months at 30–40% relative humidity and room temperature, the values are $2.5 \times 10^9$ ohms for $R_v$ and $6.0 \times 10^{10}$ ohms for $R_s$.

EXAMPLE 5

446 g of cellulose panels (hardwood, bleached) are cut into strips (about 2.5×14.8 $cm^2$) and are placed, in 3 portions, into a solution consisting of the polyethylene glycol 400 diacrylate Sartomer SR 344 and 4% $NaClO_4H_2O$. The strips are in a vessel which is inside an evacuable vessel. Degassing is then carried out for about 30 minutes at a pressure of 0.3 mbar. The impregnated strips are subsequently stood up to dry. The weight of the impregnated cellulose is now 681 g. The strips impregnated in this way are cut into pieces measuring about 1×1 $cm^2$ and are comminuted to fibres in an ultracentrifugal mill (Retsch, Model ZM 1000) first with an annular sieve of 2 mm and then with an annular sieve of 1 mm.

EXAMPLE 6

The impregnated cellulose described in Example 5 (for amounts and results of measurements see Table 1) is added in each case to 45 g of the polypropylene Profax 6501, and the components are carefully mixed. These mixtures are processed in a 2-roll mill (calender) at 180° C. for 9 minutes to form a rolled sheet (nip 0.4 mm). Plates are then produced with a metal template (15×15×0.05 $cm^3$) under pressure in a heated hydraulic press (processing for 5 minutes at 200° C.)

The plates produced in this way are dried over blue gel for one week. The surface resistance values $R_s$ are then measured (with a sprung-tongue electrode in accordance with DIN 53482, at a voltage of 500 V, at 22° C. and with a dry atmosphere of <about 15% relative humidity). The results are set out in Table 1.

TABLE 1

| Polypropylene Profax 6501 | impregnated cellulose Example 5 | Surface resistance $R_s$ [ohms] |
|---|---|---|
| 45.0 g | 3.0 g | $2 \times 10^{11}$ |
| 45.0 g | 2.0 g | $3 \times 10^{11}$ |

TABLE 1-continued

| Polypropylene Profax 6501 | impregnated cellulose Example 5 | Surface resistance $R_s$ [ohms] |
|---|---|---|
| 45.0 g | 1.5 g | $2 \times 10^{12}$ |
| 45.0 g | 0 g = reference | $>2 \times 10^{14}$ |

What is claimed is:

1. A composition which comprises
   (A) a thermoplastic, structurally crosslinked elastomeric or thermosetting polymer,
   (a) a polar, adsorptive organic material in the form of fibers or particles which are in mutual contact, onto which is adsorptively bound
   (b) a polar antistatic agent comprising a mixture of
      b1) at least one polar organic compound having at least 5 carbon atoms and at least 3 heteroatoms selected from the group consisting of polyethers, crown ethers, polyols, polyimines, polyamines, polymers derived from pyridine, macrocyclic aza compounds, polysulfides and polyphosphines, and
      b2) the salt of a protic acid which is solvated or complexed in the polar organic compound b1) and which is selected from the group consisting of $LiClO_4$, $LiCF_3SO_3$, $NaClO_4$, $LiBF_6$, $NaBF_6$, $KBF_6$, $NaCF_3SO_3$, $KClO_4$, $KPF_6$, $KCF_3SO_3$, $Ca(ClO_4)_2$, $Ca(PF_6)_2$, $Ca(CF_3SO_3)_2$, $Mg(ClO_4)_2$, $Mg(CF_3SO_3)_2$, $Zn(ClO_4)_2$, $Zn(PF_6)_2$ and $Ca(CF3SO_3)_2$.

2. A composition according to claim 1, wherein the polar antistatic agent (b) comprises
   b1) a polyoxyalkylene of formula I

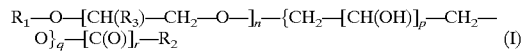

$$R_1-O-[CH(R_3)-CH_2-O-]_n-\{CH_2-[CH(OH)]_p-CH_2-O\}_q-[C(O)]_r-R_2 \quad (I)$$

wherein
   $R_1$, is hydrogen, $C_1-C_{24}$alkyl, $C_2-C_{24}$alkenyl, $C_1-C_{24}$alkyl—C(O)—, $C_2-C_{24}$alkenyl—C(O)—, $CH_2=CH-C(O)$— or $CH_2=C(CH_3)-C(O)$—,
   $R_2$ is $C_1-C_{24}$alkyl, $C_2-C_{24}$alkenyl, —$CH_2$—COOH or $N(C_1-C_8alkyl)Hal$ or, when r is 0, $R_2$ is additionally $CH_2=CH-C(O)$— or $CH_2=C(CH_3)-C(O)$—,
   $R_3$ is hydrogen or methyl,
   Hal is Cl, Br or I,
   n is a number greater than or equal to 2,
   p is a number from 1 to 6,
   q and r independently of one another are 0 or 1; and
   b2) the salt of a protic acid which is solvated or complexed in the polar organic compound b1) and which is selected from the group consisting of $LiClO_4$, $LiCF_3SO_3$, $NaClO_4$, $LiBF_6$, $NaBF_6$, $KBF_6$, $NaCF_3SO_3$, $KClO_4$, $KPF_6$, $KCF_3SO_3$, $Ca(ClO_4)_2$, $Ca(PF_6)_2$, $Ca(CF_3SO_3)_2$, $Mg(ClO_4)_2$, $Mg(CF_3SO_3)_2$, $Zn(ClO_4)_2$, $Zn(PF6)_2$ and $Ca(CF_3SO_3)_2$.

3. A composition according to claim 1, in which (A) the thermoplastic, structurally crosslinked elastomeric or thermosetting polymers are selected from the group consisting of polyolefins, polystyrenes, polymers of α,β-unsaturated acids, halogen-containing polymers, homo- and copolymers of cyclic ethers, polymers of unsaturated alcohols and amines, polyacetals, polyphenylene oxides, polyurethanes, polyamides, polyesters, polyureas, polycarbonates, polysulfones, crosslinking products of aldehydes on the one hand and phenols, urea or melamine on the other hand, alkyd resins, crosslinkable acrylic resins, crosslinked epoxy resins, cellulose and natural rubber.

4. A composition as claimed in claim 3, in which (A) the thermoplastic, structurally crosslinked elastomeric or thermosetting polymers are selected from the group consisting of polyolefins, polystyrenes, polymers of α,β-unsaturated acids, halogen-containing polymers, and homo- and copolymers of cyclic ethers.

5. A composition according to claim 1, in which (a) the organic material is porous and has an internal surface area of 5–500 $m^2/g$.

6. A composition according to claim 5, in which (a) the porous adsorptive organic material is a urea-formaldehyde polycondensate.

7. A composition according to claim 6, in which (a) the adsorptive organic fibres employed are granular or fibrous, naturally occurring organic materials, comminuted wood or plant residues.

8. A composition according to claim 7, in which (a) the naturally occurring fibres employed are cotton, bast, jute, kapok, ramie, flax, hemp, wool fibres or silk fibres.

9. A composition according to claim 1, in which (a) the particles have a mean particle size of from 1 to 5000 μm.

10. A composition according to claim 6, in which (a) the organic fibres have a length of from 0.01 to 200 mm.

11. A composition according to claim 1, in which the polar organic compound (b1) has an olefinically unsaturated carbon bond, a functional group derived from α,β-unsaturated carboxylic acids, an isocyanate group or a glycidyl group.

12. A composition according to claim 2, in which $R_1$ is H, $C_1$–$C_4$alkyl, $CH_2$=CH—C(O)— or $CH_2$=C($CH_3$)—C(O)—.

13. A composition according to claim 2, in which $R_2$ is $C_6$–$C_{20}$alkyl, $C_6$–$C_{20}$alkenyl or N($C_1$–$C_8$alkyl)$_3$Cl, $CH_2$=CH—C(O)— or $CH_2$=C($CH_3$)—C(O)—.

14. A composition according to claim 2, in which n is a number between 2 and 20 and p is a number between 2 and 6.

15. A composition according to claim 2, wherein the compounds of the formula I are selected from the group consisting of polypropylene glycol lauryl ester, polypropylene glycol oleyl ether, polypropylene glycol methydiethylammonium chloride, polyethylene glycol monomethyl ether, polyethylene glycol dimethyl ether, polyethylene glycol lauryl ester, polyethylene glycol oleyl ester, polyethylene glycol oleyl ether, polyethylene glycol sorbitan monolauryl ester, polyethylene glycol stearyl ester, polyethylene glycol polypropylene glycol lauryl ether, polyethylene glycol lauryl ether-carboxylic acid, polyethylene glycol diacrylate, monacrylate and triacrylate, or polyethylene glycol dimethacrylate, monomethacrylate and trimethacrylate.

16. A composition according to claim 1, in which the polar organic material in the form of fibers (a) is present in an amount of from 0.01 to 70 parts by weight per 100 parts by weight of polymer (A).

17. A composition according to claim 1, in which the polar organic compounds b1) are present in an amount of from 0.01 to 20 parts by weight per 100 parts by weight of polymer (A).

18. A composition according to claim 1, in which the salt b2) used is present in an amount of from 0.01 to 5 parts by weight per 100 parts by weight of polymer (A).

19. A composition according to claim 1, in which the ratio of the organic compound b1) to the salt b2) is from 200:1 to 1:1.

20. A process for preparing an antistatically treated thermoplastic, structurally crosslinked elastomeric or thermosetting polymer, which comprises using apparatus selected from the group consisting of calenders, mixers, compounders and extruders and combinations thereof to mix a composition comprising
(a) a polar, adsorptive organic material in form of particles or fibers, to which is adsorptively bound (b) a polar antistatic agent comprising a mixture of
b1) at least one polar organic compound having at least 5 carbon atoms and at least 3 heteroatoms selected from the group consisting of polyethers, crown ethers, polyols, polyimines, polyamines, polymers derived from pyridine, macrocyclic aza compounds, polysulfides and polyphosphines, and
b2) the salt of a protic acid which is complexed or solvated in the polar organic compound b1), and which is selected from the group consisting of $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $Ca(ClO_4)_2$, $Ca(PF_6)_2$, $Ca(CF_3SO_3)_2$, $Mg(ClO_4)_2$, $Mg(CF_3SO_3)_2$, $Zn(ClO_4)_2$, $Zn(PF_6)_2$ and $Ca(CF_3SO_3)_2$ with a thermoplastic, structurally crosslinked elastomeric or thermosetting polymer (A).

* * * * *